ELECTRON IMAGE CORRELATOR TUBE WITH IMPROVED READ-OUT MEANS

Filed June 23, 1966

INVENTORS
ERMAL E. PENIX
HARRY O. PFEIFFER
BY: [signature]
ATTORNEY

3,476,197
ELECTRON IMAGE CORRELATOR TUBE WITH IMPROVED READ-OUT MEANS

Ermal E. Penix, Akron, and Harry O. Pfeiffer, North Canton, Ohio, assignors to Goodyear Aerospace Corporation, Akron, Ohio, a corporation of Delaware Filed June 23, 1966, Ser. No. 559,921
Int. Cl. H04n 5/74
U.S. Cl. 178—6.8 7 Claims

ABSTRACT OF THE DISCLOSURE

This invention relates to an image matching system, and more particularly to a single electronic tube which, upon appropriate energization, stores a reference electronic image pattern, correlates a second present electronic image pattern with the reference electronic image pattern, produces an electrical output signal which is a function of the correlation between the patterns and indicates six degrees of error, and where the read-out very accurately can be used to close the correlation loop to overcome any system errors.

Heretofore, the art of image correlation has been set forth in such systems as shown in U.S. Patent Nos. 3,102,-260 and 3,054,999 which are generally referred to as "Map Matching" systems. However, these systems require complex circuits and separate image storage apparatus to effect the comparison and to achieve the correlation function. In other words, the reference image and the present image for comparison are not area-correlated in a single tube with a minimum of circuitry. There have been attempts to provide a correlation in a single tube, and certain apparatus to achieve such techniques are disclosed in Patent 3,290,-546, dated Dec. 6, 1966, application Ser. No. 232,961 and Pat. No. 3,424,937, dated Jan. 28, 1969, Ser. No. 424,439, both also assigned to the Goodyear Aerospace Corporation, However, these correlator tubes have certain deficiencies, such as high voltage requirements for operation, no amplification facilities within the tube between the storage mesh and the take off or output anode, and no capability to overcome system errors to insure highly reliable correlation information.

Therefore, it is the general object of the present invention to avoid and overcome the foregoing and other difficulties of and objections to the prior art practices by providing a simplified, improved, relatively inexpensive image matching system available within an electronic image tube which will be operable with high efficiency, speed, but low operating cost.

Another object of the invention is to provide a single electronic tube which stores and correlates electronic image patterns where the intensity of the correlated patterns can be amplified within the tube, and further where the correlated output information can be rendered substantially error free in any of six degrees of possible error in the input electron image patterns.

A further object of the invention is to provide an electronic image correlator tube where the storage grid is aligned with an input light responsive photocathode, but where the grid is smaller in size so that only a desired portion of an optical input onto the photocathode will be stored or correlated relative to the storage grid.

The aforesaid objects of the invention, and other objects which will become apparent as the description proceeds are achieved by providing an image matching system for electrically correlating optical reference display information with optical present display information which information necessarily has irregularities comprising an electronic tube having read-in means operative to store a first electronic image pattern which is equivalent to the optical display information, an electronic storage grid means for storing a selected portion of the first electronic image pattern, read-out means to sense the number of electrons that pass through the grid means, means to amplify the electrons which pass through the grid means and are detected by the read-out means, the read-out means being electrically divided into quadrants, means to provide a second electronic image pattern which is equivalent to the optical present display information, and means for focusing and nutating the second electronic image pattern relative to the first electronic image pattern stored on the grid means in a plane substantially parallel to the plane of the grid means to correlate the electronic image patterns, the degree of correlation received as a current detecting the maximum number of electrons sensed by the read-out means, and logic circuit means associated with the read-out means and the display information to render the current detected by the read-out means error free from any irregularities of the display information.

For a better understanding of the invention, reference should be had to the accompanying drawings, wherein.

The art of image correlation generally involves providing a reference image of a certain section of the earth's terrain. Then a subsequent image of the same area of the terrain hereinafter called the present image, is matched or correlated with the reference image. In this manner, an unmanned aircraft can fly a predetermined flight path governed by previously prepared reference image information. Of course, there are many other uses for such map matching techniques.

Figure 1:
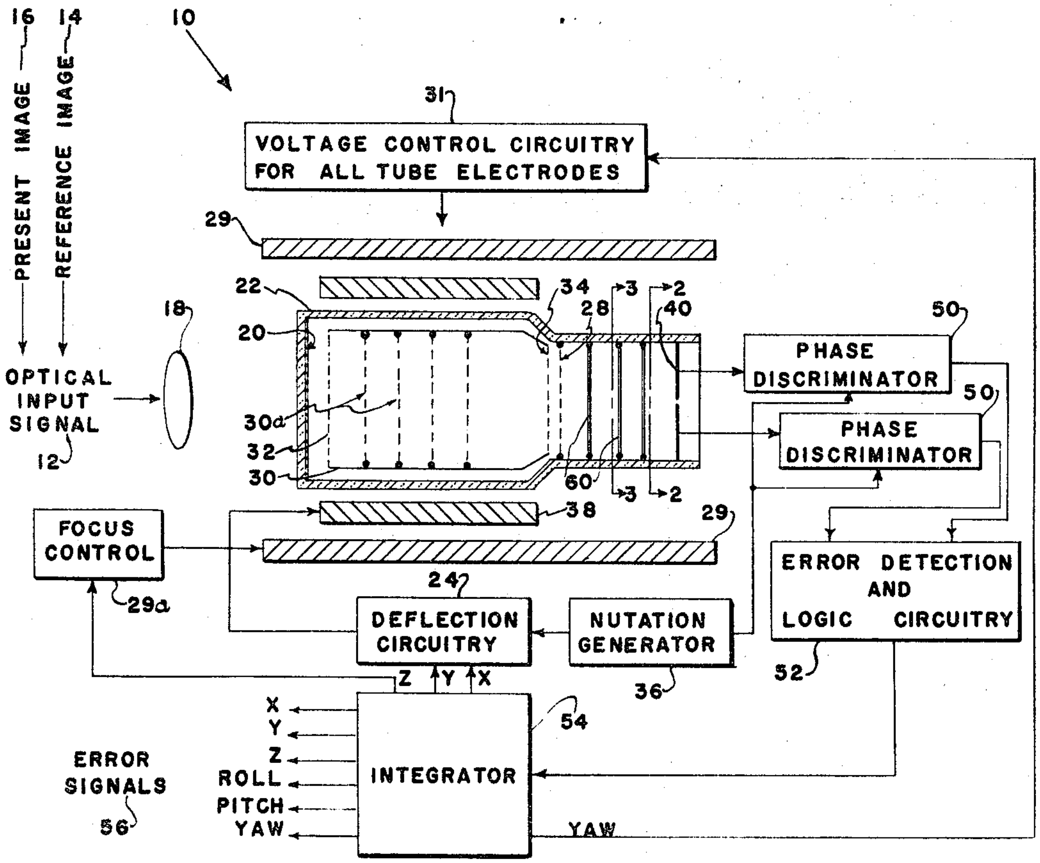
FIGURE 1 is a schematic illustration of the preferred embodiment of the image matching system of the invention.

With reference to the drawings, there is shown in FIGURE 1, an image matching system which is indicated generally by numeral 10 and comprises an optical input signal 12 which is made up of reference image information 14 and present image information 16. The reference image information 14 may be stored radar signals of the earth's terrain, previously prepared film, or other reference information. Generally, the invention contemplates that the reference information will be focused by a lens 18 onto a photo cathode 20 which is positioned on one end of a correlator tube, indicated generally by numeral 22. The optical image projected on the photo cathode 20, which is a light sensitive element, is converted thereby into an electronic image which is accelerated by the application of appropriate voltage applied to the tube 22 between the photo cathode 20 and a storage grid 28. A permanent or electro-magnetic coil or solenoid 29 is used to achieve a focus through a focus control circuit 29*a* of the image onto the storage grid 28.

As a feature of the invention, it should be noted that the preferable form of the tube is substantially cylindrically shaped, but in order to eliminate the possibility of interference caused by the edge or masked portion of the photo cathode 20 from being stored or correlated onto the storage grid 28, the storage grid 28 is of smaller size or reduced circumference than the photo cathode 20. The tube 22 is necked down to achieve the desired reduced diameter, although if the tube were of uniform circumference along its length, the grid 28 could be mounted in a suitable ring to effect the desired diameter reduction.

The grid 28 is positioned substantially parallel to the photocathode 20, but spaced therefrom. After the electronic reference image is stored on the grid 28 of the tube 22 because of the electron secondary emission characteristics thereof, as more fully detailed in the above cited patent applications, and in the manner usually known in the art, the optical present information 16 is projected through the lens 18 onto the photocathode 20. The optical present information is active information such as an actual direct visual signal. It is apparent that other known optical input signals, such as film or direct radar displays, could be utilized in place of the reference image information 14 and the present image information 16, respectively. However, the objects of the invention are well suited to a direct visual input signal where the amplification, intensity, and contrast thereof cannot be changed.

In order to assist in a uniform pickup of the electrons emitted from the photocathode 20 for transferring the electronic image represented thereby for presentation onto the grid 28, the invention contemplates positioning a drift tube 30 concentrically aligned within the tube 22 between the photocathode 20 and the storage grid 28. Essentially the invention contemplates that the electrons will pass through the drift tube 30 without acceleration so that uniform deflection thereof may be achieved to provide the nutation essential for correlation, as more fully described hereinafter. Thus, a field mesh 32 is mounted on the end of the drift tube 30 and electrically isolated from the drift tube adjacent the photocathode 20 while a collector mesh 34 to receive secondary emission electrons from the storage grid 28 is mounted to the drift tube 30 parallel and adjacent thereto, as indicated in the drawings. The invention contemplates that appropriate voltage applications from a voltage control circuit 31 between the photocathode 20 and the field mesh 32 will achieve acceleration of the electrons to a desired extent, with future control of the acceleration between the collector mesh 34 and the storage grid 28, also control by proper voltag• application in a well understood manner by one skilled in the art. Also, as more fully explained in patent application Ser. No. 580,273, filed Sept. 19, 1966, image rotation may be achieved to correct possible input rotation errors by means of rotation meshes, indicated by numeral 30*a*, and field mesh 32, all mounted at spaced intervals along the drift tube 30 and electrically isolated from the drift tube and collector.

In order to achieve the correlation between the reference image information 14 and the present image information 16, the present image information 16 in an electronic form is projected and focused by the electromagnetic coil or solenoid 29 so that it falls onto the grid 28, this, of course, occurring after the reference image information 14 has been properly stored as a difference of electronic charge across the entire surface of the storage grid 28. At this point, a nutation generator 36 actuates deflection circuitry 24 to drive a deflection yoke 38 to thereby nutate or move the present electronic relative to the stored reference electronic image. As is more fully pointed out in each of the above-identified patent applications, correlation occurs because the reference electronic image stored on the grid 28 effectively space modulates the projected electron stream representing the present electron image from the photocathode, thereby permitting electrons to pass through the grid 28 at points where the projected electron stream representing the present image information is similar or correlates with the electronic image stored on the grid. This means that the maximum number of electrons will pass through the grid 28 only when the electron stream representing the present image substantially coincides or correlates with the reference electronic image. Thus, the electrons passing through the grid 28 impinge upon an output anode, indicated generally by numeral 40, positioned at the end of the tube 22 opposite to the photocathode 20, creating a current thereon which when appropriately detected represents the correlation function.

The above described correlation can be called a "product match." If it is desired to increase the signal to noise ratio of the correlation output function, a "quotient match" could be used. This involves use of a negative image stored on the grid by selective erasure techniques rather than the positive image normally produced by secondary emission. To achieve the negative image an equal potential charge pattern is formed on the grid already carrying a normal positive charged image pattern. This in turn causes more negative charges where there is image information. Taking this selective erasure combined with a bias voltage applied to the grid to reduce electron transmission in those areas of no target information, a correlation function is obtained where the electron transmission through the grid is minimum during image registration. All correlation functions and operation can be performed with the quotient match that can be performed with a product match.

Figure 2:
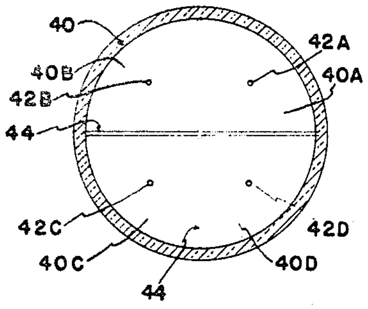
FIGURE 2 is an enlarged cross sectional view of the read-out means taken on line 2—2 of FIGURE 1.

As an important feature of the invention, the anode 40 is electrically broken into quadrants 40A, 40B, 40C, and 40D, as clearly indicated in FIGURE 2. A respective output wire 42A, 42B, 42C, and 42D is associated with each quadrant of the anode 40. The output wires are used to conduct the current flow from the anode 40 and each wire is associated with a respective phase discriminator 50. Naturally, the phase discriminator 50 receive input signals from the nutation generator 30, in the usual manner for correlation.

To eliminate any possible errors associated with the input presentation of the present image information 16 and the reference image information 14, the invention contemplates that the outputs from the discriminators 50 will be sent to an error sensing and logic circuitry 52. In this manner, the registration errors of each quadrant are compared to determine what the errors are and how to correct them. It should be understood that the input information usually always has reference errors associated with the derivation thereof. These errors result from roll, pitch, yaw, or scale factor differences between the platform associated with the derivation of the optical reference and present information. The normal phase discrimination circuitry associated with the electron image correlation tubes set forth in the above-identified patent applications can only provide correlation sensing or correction in the X and Y directions. Utilization of the quadrant takeoff with properly sophisticated error sensing and logic circuitry allows six types or degrees of error correction, namely, X, Y, and Z, yaw, roll, and pitch. Naturally, it should be understood that the anode 40 could be divided into more and smaller sections or pick-off taken from small spaced selected areas and still achieve the objects of the invention. While the contents of the error sensing and logic circuitry 52 are not described in detail, it is believed that any one skilled in the art may achieve the desired six degrees of error freedom utilizing the isolated quadrant take-off anode with proper logic circuitry to achieve the desired results. In other words, this requires computer type logic that can be constructed with several different types of circuitry by one skilled in the art when given the problem to be solved.

The invention contemplates that the separate quadrants of the anode 40 be electrically insulated from each other. Thus, the splits or gaps 44 indicated in FIGURE 2 are preferably between about .005 to about .015 inch in width. The take-off anode 40 is made from a suitable electrically conductive material, so each of the output wires 42A through 42D are used to conduct current flow from their respective quadrant sections 40A through 40D to represent the overall current received on the anode 40. This output current, then properly corrected for errors by the circuitry 52 as received from the phase discriminators 50 is then passed to an integrator 54 to determine X, Y and Z, yaw, roll and pitch error signals, indicated generally by numeral 56.

Therefore, to summarize, the tube 22 contains a light sensitive portion or photo emissive cathode 20 which emits electrons proportional to the amount of light projected thereon. The electrons emitted from the cathode 20 are accelerated towards and focused on an electron storage grid 28 by means of appropriate voltages applied to the field mesh 32, the collector mesh 34 and the storage grid 28, operating for focus in conjunction with the electromagnetic coil or solenoid 29.

The present electron image information 16 is subsequently projected on the grid 28 by exposing the cathode 20 thereto at an appropriate time. The present electron image pattern is deflected electromagnetically by means of the deflection yoke 26 to effect a nutating or scanning movement relative to the stored reference electronic pattern of the electron stream representing the optical present image 16. The particular deflection path of the present image electrons is controlled by an alternating current passed from the nutation generator 30 through the deflection circuitry 24 to the yoke 26. In order to hold the projected present electronic image in the position of best correlation, the X and Y error signals, developed in the integrator 24, are sent to the deflection circuitry 24 to achieve a correction to the deflection signal. The Z or scale factor correction is sent to the focus circuitry **29*a*, while the rotation or yaw correction is sent to the field mesh 32 and rotation meshes or grids 30*a***.

The nutation generator 30 are known components and can be provided by the average man skilled in the art. Representative circuitry for these particular components is specified in the above-identified patent applications.

Figure 3:
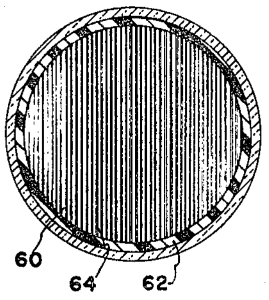
FIGURE 3 is an enlarged cross sectional view of the electronic amplification means taken on line 3—3 of FIGURE 1.

The invention further contemplates utilization of electron amplifiers 60 between the storage grid 28 and the output anode 40. Each of the amplifiers 60 is mounted in an insulating ring 62, normally made of suitable insulator material. The amplifiers 60 are preferably wide area electron multipliers such as a Venetian blind type indicated generally by numeral 64 in FIGURE 3. More specifically, the mesh 64 consists of a plurality of parallel spaced slats connected to the ring 62, and having considerable width, in the same nature as a Venetian blind. Some supporting may be necessary between the respective slats, although this will depend upon the particular size of the tube 22. In the embodiment shown in FIGURE 3, no supporting between the slats of the mesh 64 is necessary. Thus, by appropriately controlling the voltage potential applied to the electron multiplier 60, through the voltage control circuitry 31, appropriate amplification may be achieved.

Figure 4:
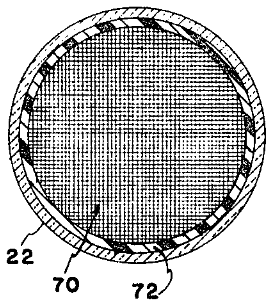
FIGURE 4 is an enlarged view of a modified electron amplification means which might be associated with the circuitry of FIGURE 1.

The invention also contemplates that the electron multiplication may be achieved by appropriate screen mesh, such as that indicated by numeral 70 in FIGURE 4. Again, the mesh 70 is mounted in an insulating ring 72 which is appropriately carried inside the necked down portion of the correlator tube 22. The particular electron amplifier utilized must be of the wide area type as it is necessary to amplify uniformly the full image pattern represented by the electrons passing through the storage grid during the nutation of one image relative to the other, as more fully defined above. Wide area electron multipliers so described produce a signal input into the phase discriminator 50 with a better signal to noise ratio than could be obtained with present state of the art external amplifiers. Of course, any suitable multiplier will meet the objects of the invention. As this state of the art improves it is contemplated that less space and power requirements will be necessary.

It should be understood that the yoke or coil 29 extends the full length of the tube 22 so as to properly focus onto the anode 40 those electrons passing through the storage grid 28 which represent the correlation function.

Therefore, it is seen that the objects of the invention have been achieved by providing a correlation tube with a necked down feature whereby the storage grid is smaller in size than the photocathode input surface eliminating storage of fringe area information as well as a mask usually associated with the photocathode. Information representing the correlation function is received in quadrants by the output anode. Such quadrant take-off relationship provides six degrees of error freedom for the correlation match. Amplification of the electron correlation signal is appropriately provided by wide area electron multipliers.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. An apparatus for electrically correlating a reference and a present optical display information comprising, an electronic tube having read-in means operative to provide an electron pattern which is equivalent to the optical display information, an electron storage grid means for storing an electron pattern, read-out means to collect the electrons that pass through the grid means, said read-out means being broken into electrically insulated quadrants, means for focusing the electron pattern generated by the read-in means on the storage grid means, means to place a reference optical display information on the read-in means to generate a first electronic image pattern which is focused on the storage grid by the focusing means and stored by the storage grid, means to place the present optical display information onto the read-in means which, as a second electronic image pattern, is projected and focused by the focusing means on the storage grid, means to move the projected and second focused electronic image pattern relative to the storage grid to correlate the electron patterns, the degree of correlation being a function of the number of electrons passed through the storage grid and collected by the read-out means, and means to error sense the signal received by the read-out means as compared with the reference to the optical display information to control six degrees of error freedom in the electrons collected by the read-out means.

2. An apparatus according to claim 1 where wide area electron multiplier means are positioned between the storage grid and the read-out means.

3. An apparatus according to claim 1 where the storage grid is smaller in size than the read-in means whereby only a selected portion of the electron pattern provided by the read-in means is focused onto the storage grid.

4. An apparatus for electrically correlating a reference and a present optical display information comprising, an electronic tube having read-in means operative to provide an electron pattern which is equivalent to the optical display information, an electron storage grid means for storing an electron pattern, read-out means to collect the electrons that pass through the grid means, said read-out means being broken into a plurality of electrically insulated sections, means for focusing the electron pattern generated by the read-in means on the storage grid means, means to place a reference optical display information on the read-in means to generate a first electronic image pattern which is focused on the storage grid by the focusing means and stored as a charge on the storage grid, means to place the present optical display information onto the read-in means which is converted to a second electronic image pattern, and is projected and focussed by the focusing means on the storage grid, nutation means to move the projected and second focused electronic image pattern relative to the storage grid to correlate the electron patterns, the degree of correlation being a function of the number of electrons passed through the storage grid and collected as separate signals by the plurality of sections of the read-out means, means to error sense the plurality of signals received by the sections of the read-out means as compared with the reference to the optical display information to indicate six degrees of error in the correlation of the electron patterns, and means to correct the nutation means with at least certain of the indications of error in the correlation of the electron patterns.

5. Apparatus according to claim 4 where the signals of the six degrees of error include X, Y, Z, roll, pitch and yaw, means to send the X and Y error signals to the nutation means to effect closed loop correction to the correlation, and means to send the Z error signal to the means for focusing the electron pattern to effect closed loop correction to the correlation.

6. Apparatus according to claim 4 which includes rotation meshes between the read-in means and the storage grid, and means to send the yaw error signal to the rotation meshes to effect closed loop correction to the correlation.

7. In an electronic image storage tube the combination of a substantially cylindrically shaped tubular glass housing closed at both ends, but transparent at one of the closed ends, a light sensitive photo emissive cathode inside the tube adjacent the transparent end thereof, a storage grid positioned in substantially parallel relationship to the cathode about midway along the length of the housing, an electrically conductive output anode mounted substantially adjacent the other end of the tube in parallel registered relationship with the storage grid, said anode being split into at least four separate insulated conductive members of substantially equal area, means to provide a proper potential between the cathode, grid, and anode whereby optical input information received on the cathode will be converted to an electron image for storage by creating a charge pattern on the grid, means to retain the charge pattern on the grid while nutating subsequent electronic image information relative to the stored information without effecting a storage thereof whereby the number of electrons passing through the storage grid and detected by the output anode represents correlation information of the subsequent electronic image with the image stored as a charge pattern on the grid, logic means coordinated with the optical input information and the correlation information detected by the separate sections of the output anode to provide reference error corrections in six degrees of error to the correlation signal detected by the output anode, and means to control the nutation of the subsequent electronic image information in accordance with the correlation signal detected by the output anode.

References Cited

UNITED STATES PATENTS

| | | | |
|---|---|---|---|
| 2,396,023 | 3/1946 | Schantz | 315—11 |
| 3,064,249 | 11/1962 | Forbath | 340—149 |
| 3,207,997 | 9/1965 | Eberhardt | 315—11 |
| 3,290,546 | 12/1966 | Link | 315—12 |

ROBERT L. GRIFFIN, Primary Examiner

J. A. ORSINO, Jr., Assistant Examiner

U.S. Cl. X.R.

315—11, 12; 340—149